United States Patent [19]

Perdu

[11] Patent Number: 4,979,119
[45] Date of Patent: Dec. 18, 1990

[54] METHOD AND SYSTEM FOR MONITORING THE PROPELLANT CONSUMPTION OF A SPACE VEHICLE

[75] Inventor: Michel Perdu, Frejus, France

[73] Assignee: Aerospatiale Societe Nationale Industrielle, Paris, France

[21] Appl. No.: 247,434

[22] Filed: Sep. 12, 1988

[30] Foreign Application Priority Data

Sep. 11, 1987 [FR] France .................. 87 12631

[51] Int. Cl.$^5$ .......................... G01F 1/80; G01F 9/00; G01F 15/075; B64G 1/40
[52] U.S. Cl. .................................. 364/442; 73/861.41; 364/510
[58] Field of Search ............... 364/442, 459, 510, 556; 244/159, 160, 135 R, 172, 158 R, 169, 74, 78, 153 C; 60/250, 254–256; 73/861.41, 861.44

[56] References Cited

U.S. PATENT DOCUMENTS

| | | | |
|---|---|---|---|
| 3,866,025 | 2/1975 | Cavanagh .......................... | 364/459 |
| 3,977,633 | 8/1976 | Keigler et al. ..................... | 244/169 |
| 4,550,888 | 11/1985 | Douglass et al. .................. | 244/169 |
| 4,609,169 | 9/1986 | Schweickert et al. ............. | 244/169 |
| 4,635,885 | 1/1987 | Hujsak .............................. | 244/172 |
| 4,802,333 | 2/1989 | Smith ............................... | 244/169 |

FOREIGN PATENT DOCUMENTS 8700816 2/1987 France ............................... 244/172
2051246 4/1980 United Kingdom ............... 244/172

*Primary Examiner*—Felix D. Gruber
*Attorney, Agent, or Firm*—Browdy and Neimark

[57] ABSTRACT

To monitor continuously the propellant consumption of a space vehicle equipped with a plurality of propulsion units operated by activator means according to activation instructions received by the activator means, the number N of activation instructions applied to each propulsion unit from a reference time and their cumulative duration S are memorized. The mass M of propellant consumed since the reference time by each propulsion unit is computed from the equation:

$$M = f(N) + g(S)$$

In this equation, f and g are independent predetermined functions. The masses consumed by each propulsion unit are summed. The functions f(N) and g(S) may be such that the above equation can be re-written:

$$M = (\dot{m} \times S) + (m_o \times N)$$

In this equation $\dot{m}$ is an average propellant flowrate during the activation of a given propulsion unit and $m_o$ is a predetermined fixed mass.

18 Claims, 2 Drawing Sheets

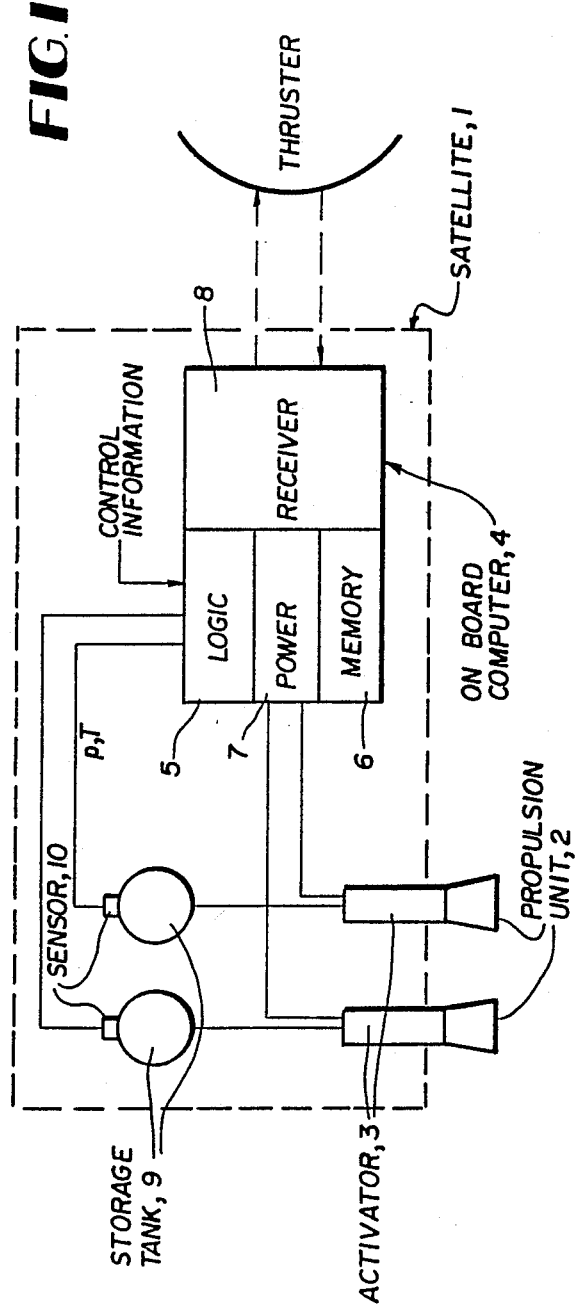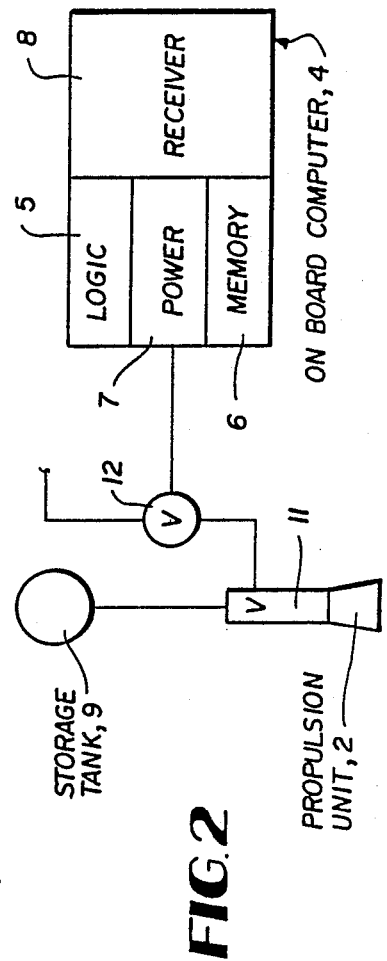

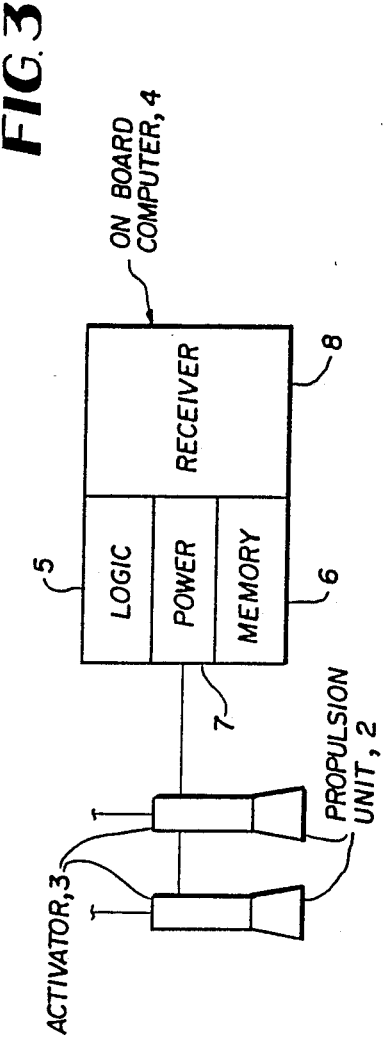
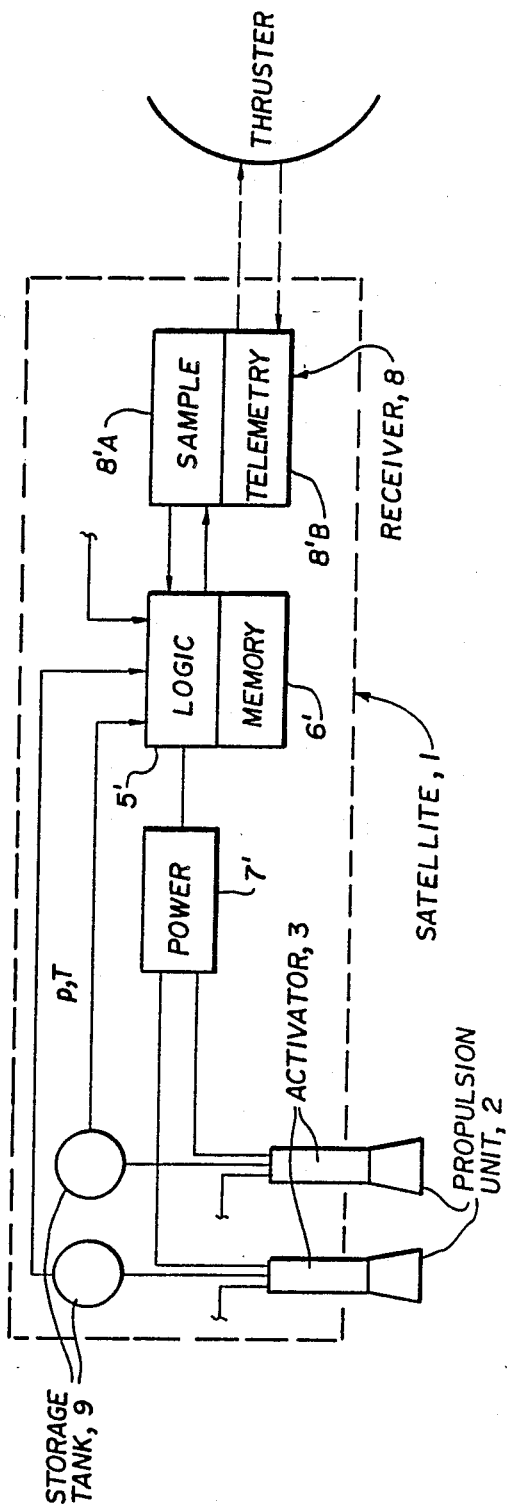

METHOD AND SYSTEM FOR MONITORING THE PROPELLANT CONSUMPTION OF A SPACE VEHICLE

BACKGROUND OF THE INVENTION

1. Field of the Invention

The invention concerns the continuous monitoring of the propellant consumption of a space vehicle equipped with a plurality of propulsion units, in particular to recognise the approaching end of the service life of the vehicle with a sufficient residual mass of propellant to eject the vehicle from its service orbit.

2. Description of the Prior Art

It has become essential to practise such ejections at the end of the service life of space vehicles to avoid saturation of geostationary orbits.

Given the requirement to perform ejection as late as possible, but with a sufficient safety margin to be sure that such ejection remains possible, there has been an increase in requirements for a high precision method and system for monitoring propellant consumption.

At present the end of the service life of space vehicles (automatic or manned satellites) is predicted with a high degree of inaccuracy with the result that removal from orbit (return to the earth of manned vehicles or automatic satellites in low orbit, placing of geostationary satellites in non-congested orbits) is done with safety margins compromising the useful service life of the system concerned.

The techniques used until now can be classified in three major categories:

a—Thermodynamic methods:

With storage tanks of constant volume using a pressurizing gas such as helium, and knowing the mass of helium on board, it is possible to compute the volume of propellant in each propellant tank by measuring the pressure and temperature in the helium tank and in each of the propellant tanks, using the equations of thermodynamics.

The accuracy of this method is not very high, principally because of unreliable physico-chemical data: solubility of the helium in the propellant, density of the propellant, saturation vapor pressure of the propellant, exact volume of the storage tanks, etc.

The same problem arises with bellows type tanks (with are being used less and less), although errors due to the helium and propellant mixing are eliminated.

b—Counting methods:

On some satellites information concerning the opening and closing of the valves of attitude and orbit control propulsion units is telemetered to the ground and the mass of propellant used computed in a crude way from this information, on the basis of average specific impulse, average thrust and valve opening time data.

Neither the content of the telemetry information nor the computation algorithms have been optimized previously for the purpose of establishing a propellant budget, but rather for the purpose of surveillance action (estimation of disturbing torque, fault tracing, etc): at this time there is no expression of the requirement for accuracy in the propellant budget used in functional specifications at system level.

c—Direct level, volume or flowrate measurement methods:

Known solutions in this area all describe instruments for direct measurement of liquid level, liquid or gas volume, liquid or gas flowrate.

For a space vehicle application, only volume and flowrate measurements are feasible; all known devices are:

entirely dedicated to the corresponding measurement, whence an increase in direct weight (instruments) and related weight (cables, electrical power supply, etc), highly hypothetical in use, as they rely on complex techniques as yet unproven in space.

There is also known from patent No. FR-2.414.721 an instrument for measuring low weight flowrates of liquid, based on measuring an Archimedian thrust.

The invention is directed to a method, and to a system for implementing the method, for monitoring the propellant consumption of a space vehicle in an accurate and simple way, without requiring the transmission to the ground of a large volume of data and without adding significant volume or weight in terms of dedicated onboard equipment.

SUMMARY OF THE INVENTION

In one aspect, the present invention consists in a method for monitoring continuously the propellant consumption of a space vehicle equipped with a plurality of propulsion units operated by activator means according to activation instructions received by said activator means, in which method the number N of activation instructions applied to each propulsion unit from a reference time and their cumulative duration S are memorized and the mass M of propellant consumed since said reference time by each propulsion unit is computed from the equation:

$$M = f(N) + g(S)$$

in which f and g are independent predetermined functions, and the masses consumed by each propulsion unit are summed.

In preferred embodiments of the invention:
said mass M is computed from the equation:

$$M = (\dot{m} \times S) + (m_o \times N)$$

in which $\dot{m}$ is an average propellant flowrate during the activation of a given propulsion unit and $m_o$ is a predetermined fixed mass;

a periodic succession of reference times is defined and at each reference time for each propulsion unit the number and cumulative duration of activation instructions since the last reference time are memorized, the mass of propellant consumed since the reference time is computed and the masses successively computed in this way are summed;

the number N and the cumulative duration S of the activation instructions are transmitted to the ground and the masses of propellant consumed may be determined on the ground;

the mass of propellant consumed by the propulsion units may be determined on board the vehicle and transmitted to the ground.

In another aspect, the invention consists in a system for monitoring the propellant consumption of a space vehicle equipped with a plurality of propulsion units, activator means associated with said propulsion units and a control unit adapted to apply activation instructions to said activator means, the system comprising in said control unit a logic unit, a memory area of said logic unit adapted to store the number N and the cumulative duration S of said activation instructions from reference times, a power stage adapted to apply said activation instructions to said activator means according to logic signals produced by said logic unit, a unit adapted to sample the contents of said memory area at each reference time and to transmit to the ground a telemetry signal representing said contents, and means for computing the mass M of propellant consumed since the reference time from the equation:

$$M = f(N) + g(S)$$

in which f and g are independent predetermined functions.

In preferred embodiments of the invention:

said activator means are electromagnetic valves each associated with a respective propulsion unit;

said activator means comprise a pneumatic valve adapted to control the flow of propellant to a propulsion unit and an electromagnetic valve controlled by said power stage and adapted to control the flow of pneumatic fluid to said pneumatic valve;

pressure and/or temperature sensors are associated with said propulsion units and connected to said logic unit.

The minimal equipment needed for implementing the invention is therefore that which implements the following functions:

(a) acquisition of the total activation time of the propulsion units during a period T;

(b) acquisition of the total number of activations of the propulsion units during the period T;

(c) storage of this data and communication of it to the ground at the end of the period T;

(d) physical implementation for the computation algorithm;

(e) data reception and storage.

Generally speaking, functions (c), (d) and (e) can be implemented by equipment already present on the satellite or on the ground and merely need the corresponding requirements to be allowed for in specifying this equipment in a broader context.

Functions (a) and (b) must be specified explicitly during the design of the satellite. As is well known, the performance of any propulsion unit in pulse mode can be characterized by two measurable parameters:

the impulse-bit IB, the specific impulse IS given as a function of the average electrical opening time TO and the electrical closing time TF (since the last pulse) of the propulsion unit valves.

These two parameters are generally measured separately and from them are deduced, depending on the source, either tables of numeric functions or tables for each of the variables:

$$IB = F1(TO, TF),$$

$$IS = F2(TO, TF),$$

the measured values being for a given inlet pressure and a given propellant temperature.

Dividing IB by IS gives the propellant consumption for a given impulse (as a function of TO, TF) and it would therefore be a simple matter to produce a propellant budget knowing TO and TF for all the service life of the satellite.

A very large amount of information is needed to define TO and TF exactly and consideration has never been given to transmitting this to the ground, for reasons of congestion of the telemetry format at least.

On the other hand, the algorithm of the present invention requires only two items of data:

(1) the sum of the activation durations during a given period (one counter per propulsion unit);

(2) the total number of pulses during the same period (one counter per propulsion unit).

For this data to be sufficient, the function $\Delta m = F(TO, TF)$ has been simplified as follows:

$$\Delta m = (\dot{m} \times TO) + m_o$$

where $\dot{m}$ = average propellant flowrate, $m_o \times$ fixed mass of propellant consumed on each impulse, which amounts to saying that the variation of $\Delta m$ due to the closing time is caused by rapid evaporation in space of a fixed mass of propellant injected into the circuits on the downstream side of the propulsion unit valve on each impulse and not used for propulsion;

$\dot{m}$ and $m_o$ are computed from the values $\Delta m = F(TO, TF)$ by choosing $\dot{m}$ so as to minimize the mean standard deviation of the value $m_o$ obtained by statistical processing of the function $m_o \times R(\dot{m}, TO, TF)$;

TO, TF and m being known with great accuracy, the error in the method is due to the mean standard deviation of $m_o$. The propellant budget used is produced as follows:

$$M = (\dot{m} \times (\Sigma TO)) + (m_o \times N)$$

where $\Sigma TO$ = sum of activation durations,

N = total number of impulses.

The accuracy of the propellant budget is increased by the inclusion of the following secondary equipments:

one or more pressure sensors, depending on the number of storage tanks and the complexity of the propulsion system, giving either the pressure in the storage tanks or the pressure of the propellant on the inlet side of the propulsion unit valve or valves, conventional computation algorithms relating the data IB and IS to the measured pressures, one or more temperature sensors, depending on the number of storage tanks and the complexity of the propulsion system, giving either the temperature in the storage tanks or the temperature of the propellant on the inlet side of the propulsion unit valve or valves, conventional computation algorithms relating the data IB and IS to the measured temperatures.

Generally speaking, the invention is applicable to:

gas or liquid propulsion systems;

pressurization systems of any kind in which the flowrate is controlled by a valve whose opening and closing times can be measured.

Objects, characteristics and advantages of the invention will emerge from the following description given by way of non-limiting example only with reference to the appended diagramatic drawings.

BRIEF DESCRIPTION OF THE DRAWINGS

FIG. 1 is a schematic view of a satellite equipped with a propellant consumption monitoring system in accordance with the invention.

FIG. 2 is a partial schematic view of a first embodiment.

FIG. 3 is a partial schematic view of a second embodiment.

FIG. 4 is a partial schematic view of a third embodiment.

DESCRIPTION OF THE PREFERRED EMBODIMENTS

FIG. 1 shows in a schematic way, on board a satellite 1 equipped with propulsion units 2, the essential items for implementing the invention.

The propulsion units 2 are each provided with activator means 3 receiving activation instructions from a control unit 4 common to the various propulsion units.

The control unit comprises a logic unit 5, a memory area 6, a power stage 7 and a telemetry unit 8 adapted to exchange information with the ground T. Data reception and processing means (not shown) are provided on the ground.

The units 5, 6 and 8 (and possibly unit 7) form part of an onboard computer, for example.

The component parts of the control unit are all of appropriate known type, the invention concerning how they are combined.

The logic unit 5 transmits logic signals (low current, low voltage—5 V, for example) to the power stage 7 which derives from them control or activation instructions (medium current, medium voltage—26 V, for example) for at least one of the propulsion units 2.

The logic unit 5 also receives control information C, possibly via an interface (not shown). The information C comprises, for example, the output from a control loop, for example a loop controlling/guiding the space vehicle 1 relative to one of its rotation axes; this information may also include semi-automatic speed pulses.

It is from this information C and/or instructions received from the ground via the unit 8 that the logic unit 5 produces the previously mentioned logic instructions, representing electrical on/off control cycles for one or more propulsion units 2.

From the logic signals the unit determines the number N of open/close cycles (or activation instructions) for each propulsion unit from a reference time and the sum S of the open or activation times of this propulsion unit from the same time. These parameters N and S are stored in the memory area 6.

This memory area is read by the telemetry unit 8 and the values obtained in this way are transmitted by it to the ground, in a format appropriate to the space vehicle 1.

A periodic succession of reference times is preferably defined and at each of these times the values stored in the memory area 6 are retrieved and transmitted to the ground by the unit 8 before said area is cleared. The parameters N and S are therefore sampled at the frequency set by the reference times.

In FIG. 1 the activation means are valves, preferably electromagnetic valves, which determine the flowrate of propellant (oxidant/fuel) from storage tanks 9 containing a propulsion fluid.

These storage tanks are associated with sensors 10 adapted to transmit to the logic unit pressure and/or temperature information relating to the internal volume of these tanks.

In the FIG. 2 embodiment the activation means associated with a propulsion unit comprise a pneumatic valve 11 controlling the supply of propulsion fluid to the propulsion unit 2 and an intermediate electromagnetic valve 12 controlled by signals from the power stage 7 and controlling the supply to the valve 11 of a pressurization fluid from a storage tank (not shown).

If transmission to the ground is not possible for a time, the successive values of N and S are stored in the memory area 6 over several periods and are transmitted to the ground as soon as transmission conditions are again satisfactory.

The telemetry unit can sample the values of N and S stored in the memory area 6 in digital or analog form.

In the FIG. 3 embodiment the activation instructions are applied simultaneously to the several propulsion units through synchronized activator means. In an alternative embodiment (not shown) these instructions are applied in succession to the several propulsion units.

In another embodiment (not shown) the propulsion fluid is stored in a plurality of storage tanks and its feeding to the associated propulsion unit is controlled by several synchronized valves.

The same applies where two fluids (fuel/oxidant) must be fed to the same propulsion unit.

The mass of propellant consumed by a propulsion unit between two reference times is computed on the ground from an equation of the type:

$$M = f(N) + g(S)$$

where f and g are independent predetermined functions.

The function f is preferably defined by the equation:

$$f(N) = m_0 \times N$$

where $m_0$ is a predetermined fixed mass corresponding to the consumption of a propulsion unit that is ignited and then immediately extinguished, for a null propulsion duration.

The function g is preferably defined by the equation:

$$g(S) = \dot{m} \times S$$

where $\dot{m}$ is the average propellant flowrate through an activated propulsion unit.

As an alternative to this, the mass of propellant consumed between two successive reference times is computed on board the space vehicle by a microprocessor associated with the unit 1 or of which the latter forms part, and it is the result of the successive computations, stored in the memory area 6, which is transmitted to the ground by the unit 5.

Depending on requirements and availability of resources, either the values of N and S or the values of M are transmitted to the ground.

The total mass of propellant consumed is deduced by summing the computed values of M for the various time intervals and/or the various propulsion units.

FIG. 4 shows a particularly simple embodiment of the control unit 4. This is made up of separate units, the memory 6' being associated with the logic unit 5' and the telemetry unit 8' being divided into a sampling stage 8'A and a telemetry stage proper 8'B.

In this embodiment the activator means 3' feed two propulsion units with two complementary propulsion fluids (fuel/oxidant).

As an alternative to this, these items control only one propulsion unit.

Continuous computation of the propellant consumption makes it possible to predict the end of the service life of the satellite with an accuracy dependent on the precision with which the original mass is known and especially with which the functions f and g and their parameters are defined.

When the residual mass of propellant drops below a predetermined threshhold, a final activation of the appropriate propulsion units ejects the space vehicle from its orbit.

It goes without saying that the foregoing description has been given by way of non-limiting example only and that numerous variations may be proposed by those skilled in the art without departing from the scope of the invention.

The propulsion units 2 may be replaced by ion or photon propulsion units, for example.

There is claimed:

1. Method for monitoring continuously propellant consumption of a space vehicle equipped with a plurality of propulsion units operated by activator means according to activation instructions received from a control means which applies activation instructions to said activator means, said method comprising the steps of:

applying activation instructions to said activation means;

counting the number N of activation instructions applied to each of said activator means for each of said plurality of propulsion units from a reference time;

counting the cumulative duration S of said activation instructions from said reference time;

placing N and S in a memory;

computing the mass M of propellant consumed since said reference time from the equation $$M \times f(N) + g(S)$$

where f and g are independent predetermined functions; and summing the masses M consumed.

2. Method according to claim 1, wherein said step of computing said mass M comprises computing from the algorithm:

$$M \times (m \times S) \times (m_o \times N)$$

in which m is an average propellant flowrate during the activation of a given propulsion unit and $m_o$ is a predetermined fixed mass.

3. Method according to claim 1, further including the steps of:

defining a periodic succession of reference times and at each reference time for each propulsion unit memorizing the number and cumulative duration of activation instructions since the last reference time;

computing the mass of propellant consumed since the reference time; and summing the masses successively computed.

4. Method according to claim 1, wherein the steps of counting the number N and cumulative duration S of the activation instructions are preformed at a space vehicle and are transmitted to the ground and the masses M of propellant consumed are computed on the ground.

5. Method according to claim 1, wherein the step of computing said mass propellant consumed by the propulsion units is performed on board the vehicle and transmitted to the ground.

6. Method according to claim 2, further including the step of:

defining a periodic succession of reference times; and placing in memory at each reference time for each propulsion unit the number and cumulative duration of activation instructions since the last reference time;

computing the mass of propellant consumed since the reference time; and summing the masses successively computed.

7. Method according to claim 6, further including the step of transmitting the number N and cumulative duration S of the activation instructions to the ground and computing the masses M of propellant consumed on the ground.

8. Method according to claim 5, further comprising defining a periodic succession of reference times; and placing in memory at each reference time for each propulsion unit the number and cumulative duration of activation instructions since the last reference time;

computing the mass of propellant consumed since the reference time; and summing the masses successively.

9. System for monitoring the propellant consumption of a space vehicle equipped with a plurality of propulsion units having activator means associated with said propulsion units and having a control unit adapted to apply activation instructions to said activator means, the system comprising:

a logic unit in said control unit, a memory area of said logic unit adapted to store the number N and the cumulative duration S of said activation instructions from reference times, a power stage adapted to apply said activation instructions to said activator means according to logic signals produced by said logic unit, a unit adapted to sample the contents of said memory area at each reference time and to transmit the ground a telemetry signal representing said contents, and means for computing the mass M of propellant consumed since the reference time from the equation:

$$M \times f(N) + g(S).$$

10. System according to claim 9, wherein said activator means are electromagnetic valves each associated with a respective propulsion unit.

11. System according to claim 9, wherein said activator means comprise a pneumatic valve adapted to control the flow of propellant to a propulsion unit and an electromagnetic valve controlled by said power stage and adapted to control the flow of pneumatic fluid to said pneumatic valve.

12. System according to claim 9, further comprising pressure sensors associated with said propulsion units and connected to said logic unit and f is computed as a function of said pressure.

13. System according to claim 10, further comprising pressure sensors associated with said propulsion units and connected to said logic unit and f is computed as a function of said pressure.

14. System according to claim 11, further comprising pressure sensors associated with said propulsion units and connected to said logic unit and f is computed as a function of said pressure.

15. System according to claim 9, further comprising temperature sensors associated with said propulsion units and connected to said logic unit and f is computed as a function of said temperature.

16. System according to claim 10, further comprising temperature sensors associated with said propulsion units and connected to said logic unit and f is computed as a function of said temperature.

17. System according to claim 11, further comprising temperature sensors associated with said propulsion units and connected to said logic unit and f is computed as a function of said temperature.

18. System according to claim 12, further comprising temperature sensors associated with said propulsion units and connected to said logic unit and f is computed as a function of said temperature.

* * * * *